United States Patent Office 2,831,120
Patented Apr. 15, 1958

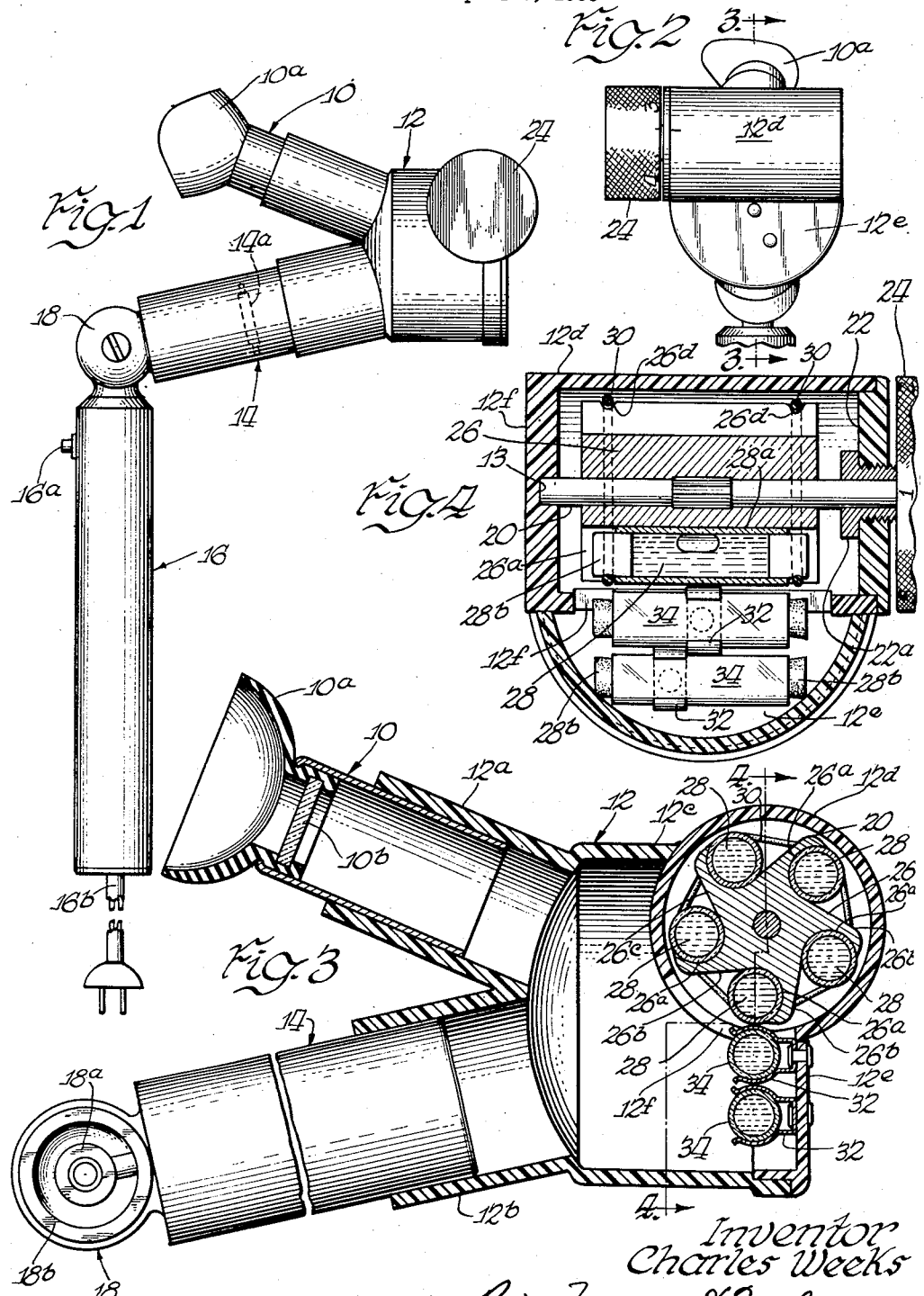

2,831,120

MECHANISM FOR QUANTITATIVE MEASUREMENT OF FLUORESCENCE

Charles Weeks, Menlo Park, Calif., assignor to Menlo Research Laboratory, Menlo Park, Calif., a copartnership Application April 7, 1953, Serial No. 347,281

2 Claims. (Cl. 250—78)

My invention relates to an improved device to determine quantitatively the fluorescence of an unknown sample.

Certain minerals and organic substances are characterized by the ability to fluoresce, or emit visible light, when exposed to ultraviolet light. The intensity and color of the fluorescence is determined by the character of the ultraviolet illumination and by the concentration of the material in the sample under inspection. For example, the common ore of tungsten, tungsten oxide, produces a bluish glow in one concentration and a yellow-golden glow in a different concentration. In addition, a wide range of organic compounds fluoresce in accordance with the hydrogen ion concentration, or pH, of the compound or the medium in which it is suspended. Methylacridone, for example, produces a green glow in the range of 1.5 to 14 pH and a violet color below a pH of 1.5.

The apparatus of the present invention permits examination of these various materials under ultraviolet illumination in such a manner that the concentration of the unknown material may be determined by an accurate side-by-side comparison of the unknown material and a plurality of reference or control specimens of known concentration. Briefly, the apparatus includes a dark chamber defined by a housing and having means to receive the unknown sample. A turret carrying a number of speciments of known concentration is positioned adjacent the unknown sample. This turret has a plurality of wells, one for each known sample. Each well has a window which exposes only a portion of the sample which is in registry with the unknown specimen. A source of ultraviolet radiation is received in a cylindrical opening in the housing and emits ultraviolet light to illuminate the interior thereof, including the unknown specimen and the reference sample. The housing has a second cylindrical opening which telescopically receives an eyepiece through which the interior of the housing is viewed to compare the unknown specimen with the selected reference specimen.

It is, therefore, a general object of the present invention to provide an improved device to determine the concentration of fluorescent materials. Another general object of the present invention is to provide a device by which an unknown and a selected known specimen may be examined under controlled radiation.

Still another object of the present invention is to provide an improved device in which a turret selectively positions any one of a plurality of known samples to adjacent position in relation to the unknown sample.

The novel features which I believe to be characteristic of the present invention are set forth with particularity in the appended claims. My invention itself, however, both as to its organization and manner of operation, together with further objects and advantages thereof, will best be understood by reference to the following description taken in connection with the accompanying drawings, in which:

Figure 1 is a top plan view of a mechanism for quantitative measurement of fluorescence;

Figure 2 is a fragmentary view of the apparatus of Figure 1 taken from the side;

Figure 3 is a fragmentary cross-sectional view through axis 3—3, Figure 2; and

Figure 4 is a cross-sectional view through axis 4—4, Figure 3.

In the unit shown in Figure 1 there is provided an eyepiece 10 through which the interior of the dark chamber 12 may be viewed. As further described hereinafter, this chamber includes samples to be examined. The interior of the dark chamber 12 is illuminated by a suitable ultraviolet light source contained in unit 14. This source is energized by elements included in the handle 16. The specimens are examined by holding the eyepiece 10a against the eye and depressing the switch 16a to flood the interior of chamber 12 with ultraviolet light.

The ultraviolet light source contained in the unit 14 may, for example, be a mercury discharge tube with a circular portion oriented perpendicular to the axis of unit 14. This tube is energized by a high voltage produced by the elements in handle 16. If, as is shown in Figure 1, the unit is intended to be operated from domestic electric current, a suitable appliance cord 16b is provided and a transformer is contained within the handle 16. The primary winding of the transformer is connected to cord 16b through the switch 16a. The secondary winding is connected to the tube 14a by means of wires located within the handle 16 and unit 14 and connected at rockable joint 18 by suitable slip rings 18a and 18b, Figure 3. Alternatively, the lamp 14a may be energized by the use of a battery source of power such as is shown in my issued patent, No. 2,613,313.

As shown in Figure 3, the dark chamber 12 has a pair of angled protruding sleeves 12a and 12b, the former telescopically receiving the eyepiece 10 and the latter telescopically receiving the unit 14. The dark chamber 12 further has a cylindrical portion 12c formed integral with these angle sleeve portions 12a and 12b. The end of the sleeve portion 12c is closed by the cylindrical wall 12d which is contiguous with the wall defined by semicircular disk part 12e to form a light-tight enclosure.

The cylindrical portion 12d of the dark chamber 12 has one solid end wall indicated at 12f, Figure 4. This wall has a bore 13 to receive the support shaft 20 which extends the length of the cylindrical portion 12d and is received in the removable cap 22 which is frictionally held in the end of the cylindrical part 12d. The shaft 20 protrudes outside of the cap 22 to receive the operating knob 24.

The shaft 20 receives the turret unit 26 which extends over the major portion of the length of the shaft. The turret defines a series of wells 26a oriented in the same direction as the shaft 20, as shown in Figure 3. Each of these wells is defined by an opaque back part 26b, which coacts with a relatively straight wall portion 26c to form a receptacle for one of the cylindrical specimen holders 28. Since the opaque back portions 26b are located on the same sides of the specimens 28 as the periphery of the turret 26 is traversed, the specimens 28 successively come to view when the turret is rotated and the interior of chamber 12 is viewed through eyepiece 10. The specimens 28 are held in the turret 26 by a pair of spaced rubber bands 30 which are received in suitable notches 26d, Figure 4, in the extreme outward portions of the turret 26.

The cap 22 which receives the shaft 20 has a bearing insert 22a which is threadedly received in the cap and holds the shaft 20.

The disk part 12e on the chamber 12 has a pair of clips 32 which receive the specimens to be examined, these being indicated at 34.

When the unit is used, the specimens 28 are placed in the turret 26 and the rubber bands 30 placed in position. As shown, each specimen consists of a glass tube 28a with its ends sealed by suitable stoppers 28b. The tube is filled with a liquid having a specific intensity or color of fluorescence. Each tube 28 is chosen to have a different color or intensity so that as the handle 24 is rotated the viewer sees successive intensities or colors. Since the samples 28 successively line up with the samples 34, the viewer can make a side-by-side comparison and very quickly determine whether the fluorescence of the sample in the chosen tube 28 is like that of the samples 34.

The samples 34 are each constructed like the tubes 28. However, the liquid in them is the unknown liquid for which the intensity or color of fluorescence is to be determined.

It will be noted that the portion 12d of dark chamber 12 has a window portion 12f which exposes the proper sample 28 to view from the eyepiece 10.

A suitable filter 10b is provided in eyepiece 10 to exclude ultraviolet rays while permitting observation of the fluorescence of samples within dark chamber 12.

In one specific application of the apparatus of the present invention, the concentration of wolfram, a common ore of tungsten, is determined. The tubes 28 are each filled with a different concentration of the ore. These different concentrations display the characteristic of emitting glows of different color and different intensities when subjected to ultraviolet light. The tubes 34 are filled with the unknown specimen to be examined. If the concentrations in tubes 28 are chosen so that some are stronger and some are weaker than the samples 34, it is possible to rotate knob 24 until the sample 28 of greater concentration and the adjacent sample 28 of lesser concentration are identified. The operator then knows that the samples 34 are of an intermediate concentration. Moreover, it may be possible to estimate which of the samples 28 is closest to the sample 34 insofar as its concentration is concerned.

Suitable numbers are provided on the handle 24, as shown in Figures 2 and 4. These register with a suitable indexing mark on the cylindrical portion of 12d of dark chamber 12 to indicate to the user which of the samples 28 is under observation.

In another application of the mechanism of the present invention, the degree of acidity or hydrogen ion concentration of a fluorescent substance may be accurately ascertained. In this instance the tubes 28 contain the substance under varying degrees of acidity and the tubes 34 contain the same substance at an unknown degree of acidity.

While I have shown and described a specific embodiment of the present invention, it will, of course, be understood that various alternative constructions and modifications may be made without departing from the true spirit and scope of the invention. I, therefore, intend by the appended claims to cover all modifications and alternative constructions falling within their true spirit and scope.

What I claim as new and desire to secure by Letters Patent of the United States is:

1. A device for use in examining specimens exposed to radiation, said device comprising: a housing having means therein for receiving an unknown specimen, the housing including means defining a receptacle having a cylindrical wall portion with an arcuate window therein opening into the housing and in close proximity to and confronting said receiving means, said receiving means lying outside of said cylindrical wall portion, a turret rotatably mounted in said receptacle concentrically of said cylindrical wall portion, said turret having a plurality of generally radially extending walls which extend in close light blocking relation to said cylindrical wall portion, and adjacent pairs of said walls being arcuately spaced substantially the same distance as the arcuate length of said arcuate window, whereby only one space between a pair of said radial walls may be aligned at any one time with said arcuate window, the space between each adjacent pair of radial walls constituting a well adapted to receive a known specimen, said turret with said radially extending walls and said cylindrical wall with said arcuate window cooperating to expose only a single known specimen in adjacent, aligned relation with an unknown specimen while simultaneously shielding all other known specimens carried by said turret, means to radiate ultraviolet radiation onto said single known specimen and said unknown specimen, and means defining an opening in said housing through which the unknown specimen and the adjacent, aligned specimen may be simultaneously viewed.

2. A device for use in examining specimens exposed to radiation, said device comprising: a housing having means therein for receiving an unknown specimen, the housing including means defining a receptacle having a cylindrical wall portion with an arcuate window therein opening into the housing and in close proximity to and confronting said receiving means, said receiving means lying outside of said cylindrical wall portion, a turret rotatably mounted in said receptacle concentrically of said cylindrical wall portion, said turret having a plurality of generally radially extending walls which extend in close light blocking relation to said cylindrical wall portion, and adjacent pairs of said walls being arcuately spaced substantially the same distance as the arcuate length of said arcuate window, whereby only one space between a pair of said radial walls may be aligned at any one time with said arcuate window, the space between each adjacent pair of radial walls constituting a well adapted to receive a known specimen, said turret with said radially extending walls and said cylindrical wall with said arcuate window cooperating to expose only a single known specimen in adjacent, aligned relation with an unknown specimen while simultaneously shielding all other known specimens carried by said turret, the housing defining a viewing side opposite the unknown specimen and the aligned, adjacent known specimen, and means defining a pair of openings in said viewing side through one of which ultraviolet radiation may be directed to simultaneously illuminate the unknown and adjacent known specimens and through the other opening the illuminated specimens may be simultaneously viewed.

References Cited in the file of this patent

UNITED STATES PATENTS

| | | |
|---|---|---|
| 2,551,542 | Marsh et al. | May 1, 1951 |
| 2,593,391 | Bray | Apr. 15, 1952 |

FOREIGN PATENTS

| | | |
|---|---|---|
| 316,417 | Germany | Nov. 25, 1919 |
| 150,433 | Austria | Aug. 25, 1937 |
| 473,043 | Great Britain | Oct. 5, 1937 |